United States Patent
Ward

(10) Patent No.: US 8,019,844 B2
(45) Date of Patent: Sep. 13, 2011

(54) SYSTEM AND METHOD FOR MONITORING DATA IN A TELECOMMUNICATIONS NETWORK

(75) Inventor: John Ward, Erie, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 930 days.

(21) Appl. No.: 11/312,012

(22) Filed: Dec. 20, 2005

(65) Prior Publication Data
US 2007/0143461 A1    Jun. 21, 2007

(51) Int. Cl.
*G06F 15/173* (2006.01)
(52) U.S. Cl. ........ 709/223; 709/224
(58) Field of Classification Search ......... 709/220–227, 709/238–244, 208, 210; 370/216, 218, 241, 370/242, 244
See application file for complete search history.

(56) References Cited

U.S. PATENT DOCUMENTS

| 5,721,929 | A  | 2/1998 | Pasquariello |
| 6,515,968 | B1 | 2/2003 | Combar et al. |
| 6,560,770 | B1 | 5/2003 | Saxena et al. |
| 6,956,845 | B2 * | 10/2005 | Baker et al. ............ 370/352 |
| 2004/0078787 | A1 * | 4/2004 | Borek et al. ........... 717/136 |
| 2006/0130070 | A1 * | 6/2006 | Graf ....................... 719/318 |

OTHER PUBLICATIONS

International Searching Authority, U.S. Patent and Trademark Office and Receiving Office, International Search Report (Form PCT/ISA/210) for international application No. PCT/US 06/62427, Feb. 15, 2008, 2 pages.
International Searching Authority, U.S. Patent and Trademark Office and Receiving Office, Written Opinion of the International Searching Authority (Form PCT/ISA/237) for international application No. PCT/US 06/62427, Feb. 15, 2008, 4 pages.

* cited by examiner

*Primary Examiner* — Wing Chan
*Assistant Examiner* — Ruolei Zong

(57) ABSTRACT

A system and method for generating an analysis and detection engine operable to monitor and report data in a telecommunications network includes a plurality of selectable processing modules. Each module is individually configurable to perform predetermined processing and data storage functions including specification of dimensions for which processing is to be applied, and collectively configurable in a linear communication path so as to define unique data analysis/detection flows.

14 Claims, 16 Drawing Sheets

SYSTEM AND METHOD FOR MONITORING DATA IN A TELECOMMUNICATIONS NETWORK

TECHNICAL FIELD

This invention relates generally to telecommunications networks, and more particularly, to an analysis and detection engine and method for monitoring and reporting data in real time.

BACKGROUND ART

From a system health perspective, it is desirable to monitor and manage networks so as to detect and respond to selected conditions and activity. Although network management means different things to different users, it is generally referred to as a service that employs a variety of tools, applications and/or devices to assist network managers in monitoring and maintaining networks.

Most network management architectures use similar structures and sets of relationships. Managed devices (end stations) such as computer systems and other network devices, run software that enables them to send alerts when they recognize problems (e.g. when one or more user-defined thresholds are met or exceeded). Upon receiving an alert, a management entity is programmed to react by executing one or more actions such as, for example, user or management notification, event logging, system shutdown, and/or automated repair.

In operation, management entities can poll the above end stations (automatically or in response to a user request) to determine the values of selected variables being monitored. Software modules (agents) function to respond to such poll. Specifically, these agents compile information regarding the managed devices in which they reside, store the information in a database, and provide it to management entities within Network Management Systems (NMSs) via network management protocols.

The International Organization for Standardization (ISO) network management forum divided network management into five functional areas, namely: fault management, configuration management, performance management, security management, and accounting management.

By way of overview, fault management is simply the process of locating, isolating and fixing (where possible) problems or faults on a network to keep it running efficiently. Because faults can cause significant and expensive downtime and/or network degradation, fault management is perhaps the most widely implemented ISO network management element.

The configuration of network devices controls the behavior of the underlying network. Accordingly, configuration management is the process of finding and setting up (configuring) these important devices. The goal of configuration management is to monitor network and system configuration information so that the effects on network operation of various versions of hardware and software elements can be tracked and managed. Each network device has a variety of version information associated with it. Configuration management subsystems store this information in a database for access. In operation, when a problem occurs, this database can be searched for clues to help solve the identified problem.

Security management is the process of controlling access to information on a network. It provides a way to monitor access points and records information on a periodic basis. Security management may also provide audit trails and/or sound alarms for security breaches. The goal of security management is simply to control access to network resources according to specified guidelines so that sensitive information is not compromised. A security management subsystem, for example, can monitor users logging into or using a network resource and can refuse access to those who enter without authorization. As those skilled in the art are aware, security management subsystems function by partitioning network resources into authorized and unauthorized areas based on department, access origination, etc. Security management subsystems perform several functions, including identifying sensitive network resources and determining mappings between sensitive network resources. As indicated above, they can also monitor access points (e.g. to sensitive network resources) and log inappropriate or unauthorized access or access attempts to such resources.

Referring still to the ISO network management model, performance management is the process of measuring and making available various aspects of network performance so that internetwork performance can be maintained at an acceptable level. Specifically, performance management functions to measure network hardware, software and media, including, for example, overall throughput, percentage utilization, error rates and response time. Performance management generally involves three main steps: (1) gathering data on selected variables of interest to network administrators; (2) analyzing the data to determine normal (baseline) levels; and (3) determining appropriate performance thresholds so that exceeding such thresholds will indicate a network problem or condition to be identified and provided attention. In operation, management entities regularly perform the above "thresholding" i.e. monitor performance variables, so that a suitable alarm can be generated and sent to a network management system if the corresponding performance threshold is exceeded.

Finally, accounting management in accordance with the ISO model involves tracking utilization and grouping of network resources to ensure that users have sufficient resources and further to provide and remove permission to use such resources. The goal of accounting management is thus to measure network utilization parameters so that individual or group users on the network can be properly regulated. This regulation minimizes network problems and maximizes the fairness of network access. For example, using accounting management, network resources can be apportioned based on resource capacities or other suitable basis. Similar to performance management, the first step of accounting management is to measure the utilization of selected network resources. The results are thereafter analyzed to provide insight into current usage patterns and to set appropriate usage quotas. Ongoing measurement of resource use may further provide billing information as well as information used to assess continued fair and optimal resource utilization.

It is specifically desirable to monitor and manage telecommunications networks where undesirable conditions and/or problems can quickly degrade the overall network and interrupt customer access and utilization with severe consequences. Such management may include monitoring of one or more of the above ISO model areas. To do so, however, custom business logic has heretofore been required to be designed, manually coded, and implemented on a task by task basis. As those skilled in the art will appreciate, such development and coding required for each management application is not only time consuming and expensive, but limits network management to a select group of highly skilled programmers and/or managers generally within corporate Information Technology (IT) departments or third party vendors who may be inaccessible years later.

Fourth generation programming (4GL) tools have been developed generally to automate the creation of software applications. Such tools have been developed to allow users to design applications and to automatically generate code that implements the applications by interacting with user interface controls.

For example, a 4GL programming tool may present an application designer with a window that represents the interface that the application (to be generated) will display to users. The 4GL tool may similarly present the application designer with user interface design tools that allow the application designer to visually construct standard user interface components on a window. For example, the user interface design tool may allow the application designer to place check boxes, menus, dialog boxes, list boxes, etc. onto a window, and allow the application designer to specify what should happen when the user interacts with those components. The user may access and view a property pull down window or "palette" for each user interface component that the user has place on the window. The pull down window lists the properties of the user interface component that can be specified by the user, and the current value of those properties.

Once the application designer has finished designing the application, the 4GL programming tool automatically generates code for the application. The form of the code may, of course, vary from implementation to implementation. For example, the 4GL programming tool may generate machine-readable code, source code, and/or metadata.

As seen, 4GL programming tools have made designing applications much easier and quicker and hopefully less error prone than the above referenced manual coding techniques. However, with this ease and speed has come a corresponding loss of flexibility in that typical 4GL tools have heretofore been generally limited to standard or "canned" sets of user interface components directed to highly specific tasks and thus highly specific data analysis. Thus, while 4GL systems are believed to have be disclosed and implemented for use in telecommunications network management, such as, for example, "Ab Initio" distributed by Ab Initio Software Corporation of Lexington, Mass., none are known to provide higher level data processing or "dimensioning" so as to allow users to segment desired analysis on a case by case basis.

Consequently, a need has developed for an improved network management tool and functionality which substantially automates the implementation of the above custom business logic so that selected telecommunications network conditions can be quickly and easily analyzed and reported in real time. Such a management tool and functionality should preferably, but not necessarily, be implemented in a 4GL language, should perform predetermined processing and data storage functions, and should specifically permit specification of dimensions for which data processing is to be applied as well as specification of dimensions for which data is to be presented.

DISCLOSURE OF INVENTION

It is a principle object of the present invention to provide a system and method for monitoring and processing data in a telecommunications network.

It is a further object of the present invention to provide a toolbox for creating an analysis and detection engine operable to implement logic in a plurality of user configurable applications to perform the above monitoring and processing including specification of dimensions for which such processing shall be applied.

Yet still further, it is an object of the present invention to provide a method for creating an analysis and detection engine operative to monitor, process and report user selectable telecommunications data in real time.

In carrying out these and other objects, features and advantages of the present invention, there is provided a toolbox for generating an analysis and detection engine. As indicated above, the toolbox is specifically directed for use in a telecommunications network and includes a plurality of user selectable and configurable processing modules. In keeping with the invention, each module is user configurable, preferable in 4GL, to perform predetermined processing and data storage functions including specification of dimensions of data for which processing is to be applied. The modules are further collectively configurable in a linear communication path so as to define a unique data analysis/detection flow. The toolbox further includes a plurality of user selectable adaptor modules. Each adaptor module is operative to receive and map data from a specific data source to a corresponding parameter of the data analysis/detection flow.

In operation, each processing module performs its predetermined functions and forwards data along the linear communication path for further processing by downstream modules of the flow in accordance with the above individual and collective user configurations so as to provide flexible and fast data reporting in real time. In a preferred embodiment, the plurality of user selectable and configurable processing modules comprise filter modules to narrow the data flowing through the flow, augmentation modules to augment the data with additional information that can be used by downstream processing modules in the flow, and of course, alarming modules to perform and report the dimensioned analysis. Still further, in a preferred embodiment, the processing modules are operative to register to a central registry thus allowing front end graphing tools to access the stored data once the corresponding flows are created.

In further carrying out the above objects, features and advantages of the present invention, there is similarly provided a method for creating an analysis and detection engine of the type disclosed above operative to monitor and process data in a telecommunications network and provide real time reports. The engine is preferable, but not necessarily, created in 4GL or other suitable programming language, and includes selecting and individually configuring at least one, and preferably a plurality, of processing modules. Each processing module is configured to perform corresponding predetermined processing and data storage functions including specification of dimensions for which processing is to be applied. The method further comprises collectively configuring the selected processing modules in a linear communication path so as to define a unique data analysis/detection flow. Still further, the method comprises selecting a pre-configured adaptor module from a plurality of pre-configured adaptor modules wherein each adaptor module is operative to receive and map data from a specific data source to a corresponding parameter of the data analysis/detection flow. The method further comprises interfacing the selected adaptor module with the selected processing modules.

The above objects, feature and advantages of the present invention are readily apparent from the following detailed description of the best modes for carrying out the invention when taken in conjunction with the accompanying drawings wherein like reference numerals correspond to like components.

BRIEF DESCRIPTION OF DRAWINGS

FIGS. 2A-2M are exemplary screen shots illustrating the generation of a flow in accordance with the present invention;

BEST MODE FOR CARRYING OUT THE INVENTION

Figure 1:
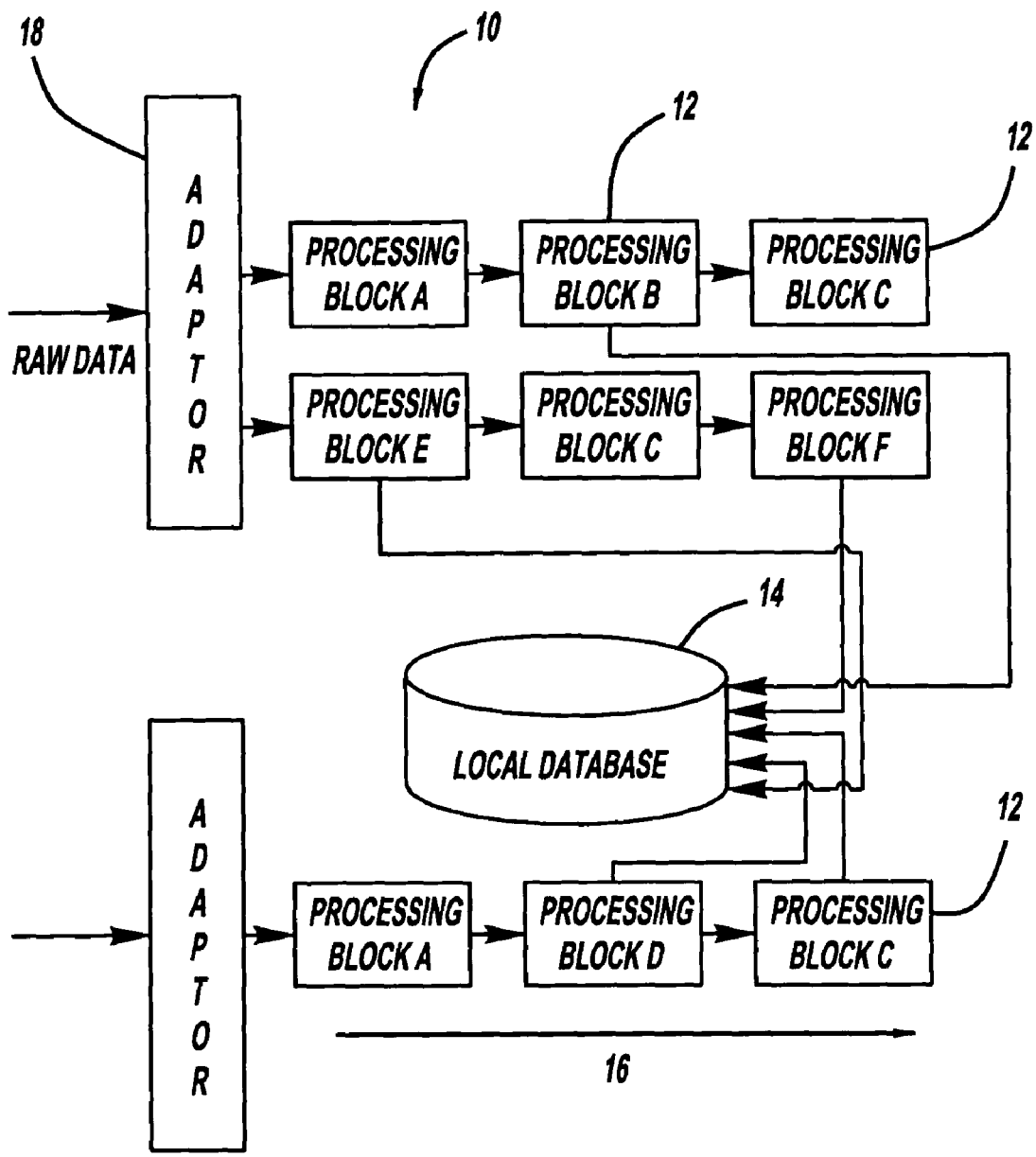
FIG. 1 is a schematic diagram of an analysis and detection engine created by the toolbox of the present invention.

The system of the present invention, and more particularly, the analysis and detection engine is shown in FIG. 1 of the drawings and designated generally by reference numeral 10. As discussed above, engine 10 is specifically designed to be implemented to monitor and detect data in a telecommunications network such as, for example, an Internet Protocol (IP) network. As those skilled in the art are aware, an IP network may comprise a fiber layer for transporting IP packets, and more specifically, to transport voice on top of an IP layer. Detection engine 10 may, however, be used to monitor and detect data in any suitable telecommunications network including, but not limited to the above referenced IP network as well as the Public Switched Network (PSTN), wireless networks, etc.

Referring still to FIG. 1, analysis and detection engine 10 comprises at least one, and preferably a plurality of processing modules 12 provided in communication with a one or more local databases or data logs 14. Each processing module 12 is individually selectable and configurable by a user to perform predetermined processing and data storage functions. In a preferred embodiment, modules 12 are configurable using a Fourth Generation programming Language, or other suitable computer language, which automates the implementation of custom business logic so that selected telecommunications network conditions can be quickly and easily analyzed and reported in real time.

In keeping with the invention, modules 12 are specifically configurable in accordance with user defined data dimensions for which processing is to be applied. For example, as will be discussed in further detail below, in the case of route loops, the user may thus specify call data pairs e.g. "calling number" and "called number" which function to define unique thresholds. Modules 12 are further collectively configurable in one or more linear communication paths so as to correspondingly define unique data analysis/detection flows 16.

Modules 12 may comprise a variety of processing type modules including augmentation modules, filter modules, and alarming modules. Like their name suggests, augmentation modules function to augment the data with additional information that can be used by downstream blocks in the flow 16. By way of example, but not limitation, augmentation modules may thus comprise calculation sub modules or "blocks" to create variables via mathematic functions on existing variables i.e. PddInSec=PddInMs/1000 with supported functions including +, -, *, /, &, etc. Augmentation modules may further comprise conditional attribution blocks operative to create new variables based on a corresponding condition or simply to classify and/or name such a condition. Still further, augmentation modules may comprise customer lookup blocks, carrier lookup blocks, record count blocks (operative to count the number of records that pass through it) and a myriad of miscellaneous blocks which may be implemented to perform specific functions.

Filter modules are used in accordance with the invention to narrow the data flowing through the flow 16. In operation, if the specific condition set by the user is not met, the data object is discarded and precluded from presentation to downstream modules. Filter modules may, of course, include any suitable filter functionality and may thus comprise, for example, condition filter blocks as well as record type filter blocks.

A condition filter block may be configured and implemented to support user defined Boolean expressions to determine if a record should pass the filter or not. (i.e. Customer=="ATT"). Operators that may be supported include, but are not limited to, >, >=, <, <=, ==, !=, !, &&, etc. as well as regular expression pattern matching. As those skilled in the art will recognize, normal precedence rules may apply, and can be controlled via ( ).

A record type block allows the user to filter the type of record flowing through the system. For example, the metrics START, STOP, ATTEMPT, and PEGCOUNT may be supported as desired.

Alarming modules perform the analysis configured in the flow 16. In keeping with the invention, alarming modules can thus be configured to operate on subsets of data defined by the user. More specifically, the user can specify dimensions for which the analysis can be applied. For example, if the user wants to detect problems with a carrier on a carrier by carrier basis, the analysis can be applied to each unique instance of a carrier. Similarly, as discussed above, if a user wants to detect routing loops in specific call/calling number pairs, the analysis can be applied to each such unique instance. Accordingly, through the unique data dimensioning function of the present invention, a mechanism is provided to detect occurrences of problems that might otherwise be missed if the analysis was otherwise limited to the data sets as a whole.

Alarming modules may comprise any suitable sub module or block depending on the desired functionality. For example, alarming modules may comprise one or more threshold blocks for detecting and alarming threshold crossings of user defined variables. Similarly, alarming modules may comprise one or more time threshold blocks which function to detect threshold crossings over time by counting the number of times a variable or condition occurs within a user defined time frame. Alarming modules may further comprise reporting blocks which, instead of alarming, count the number of times a variable or condition occurs for the express purpose of storage in a database. Still further, alarming modules may comprise rate of change blocks which function to determine the rate of change of a variable-over time. For example, from a graphical perspective, if the slope of the rate of change exceeds a user specified value, an alarm may be triggered. Yet still further, alarming modules may comprise statistical analysis blocks which function to keep the mean value of a variable and enable an alarm if the mean is violated by a user defined standard deviation. Finally, by way of example, and not limitation, an alarming module may comprise a time of day/day of week statistical analysis which functions to keep a unique mean for each 7*24 hour of the week. Again, an alarm may be enabled if the mean for the period exceeds a user defined standard deviation.

Still referring to FIG. 1, analysis and detection engine 10 further includes an adaptor module 18 which may be selected by a user from a plurality of pre-configured adaptor modules each operative to receive and map data from a specific data source to a corresponding parameter of the data analysis/detection flow 16. Adaptor modules 18 function as the interface to respective data sources. They are pre-configured to understand the format of the data coming into them, and as indicated above, function to map such data to specific parameters of the data flow 16. Parameter names can, of course, be defined by the user via a mapping file.

In operation, flows 16 register to and are provided in communication with adaptors 18 to tell the flows 16 which metrics (variables) the respective adaptor 18 need to perform their job. As such, an adaptor 18 will present the appropriate data in a known format to each flow 16 registered to it. Again, any suitable adaptor module may be configured and provided for use with the present invention, including, but not limited to, Sonus CDR adaptor, Viper SMP adaptor, Viper PegCount Adaptor, etc.

Turning now to FIGS. 2A-2M of the drawings, the creation of an exemplary flow 16 will be described in detail with reference to corresponding screen shots of a Graphical User Interface (GUI) for implementing the same. As those skilled in the art are aware, a GUI, sometimes pronounced "gooey" is a method of interacting with a computer through a metaphor of direct manipulation of graphical images and widgets in addition to text. GUIs display visual elements such as icons, windows and other gadgets. In the example discussed, the GUI is shown implemented on a Microsoft Windows® based operating system running on a personal computer (PC) or other suitable hardware. It is understand, however, that any suitable hardware/software combination may be used to implement the invention depending only on the desired application and user preferences.

Figure 2A:
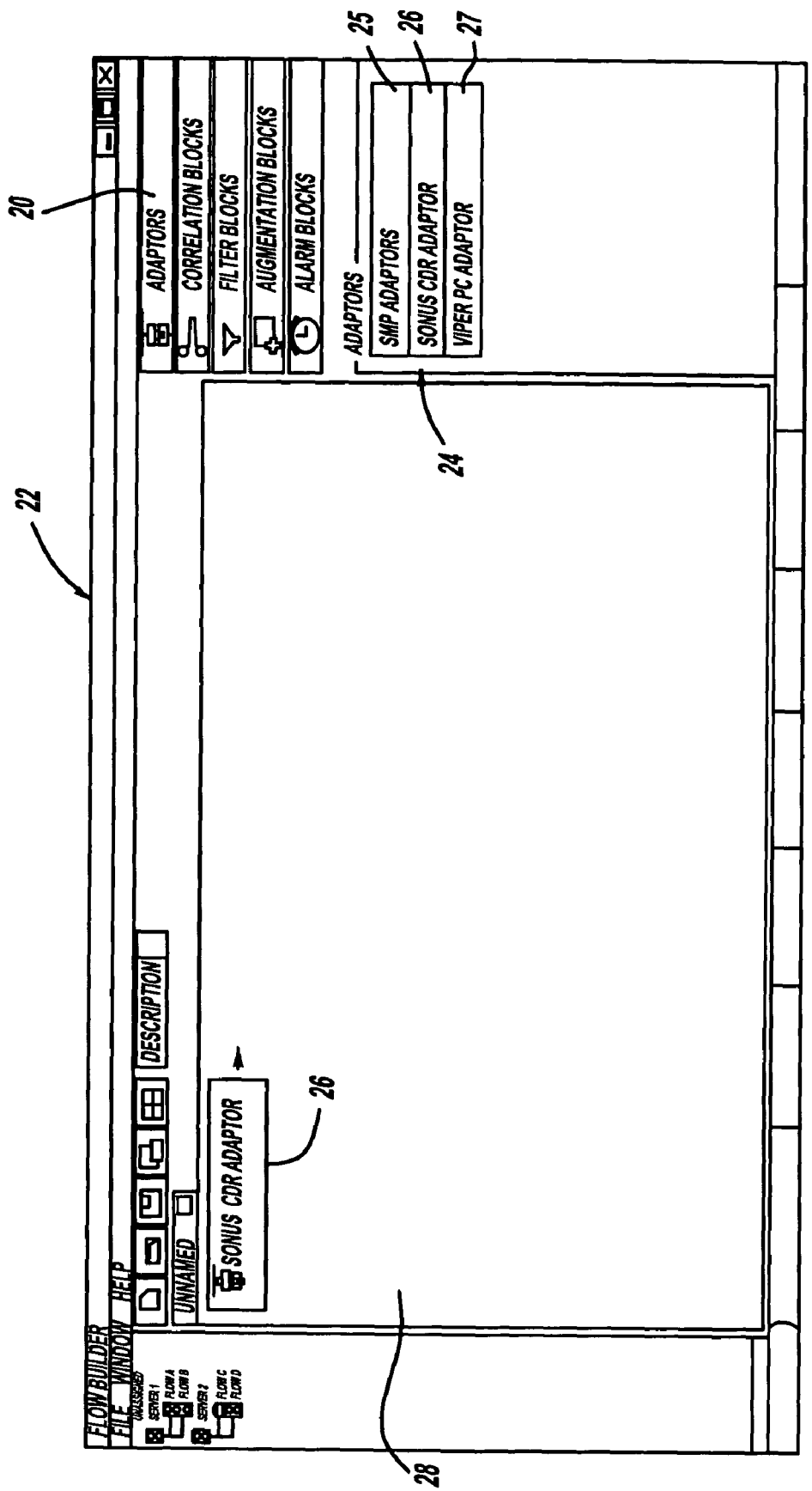

As shown in FIG. 2A, flow 16 starts with the creation of an adaptor 18 as indicated above. In the example illustrated, the user desires to detect improper route loops in general and corresponding calling number/called number routing pairs specifically. As those skilled in the art are aware, routing loops cause packets caught in the loop to traverse the same link in the network multiple times, and to show up as replicas of the original packet trace. The packets are thus said to "spiral" through the network. In IP networks, routing loops are known to be caused by inconsistencies in routing state among sets of routers. They can occur in perfectly engineered networks, and have a detrimental effect on system performance. Specifically, they impact end-to-end performance through increased packet loss and delay for packets caught in the loop, and through increased link utilization and corresponding delay and jitter for packets that traverse the link but are not caught in the loop.

Since the user desires to detect, analyze and report routing loops, it is understood that the flow 16 will be required interface with a data source providing Call Data Records (CDRs). Accordingly, a suitable adaptor 18 must be selected which is operative to interface with a CDR data source. As discussed above, adaptors are the one piece of custom code that must be provided to each flow 16 to enable it to extract data off the network from the data source. By clicking on the "Adaptors" block 20 in the GUI 22, the user is provided with a pull down menu 24 which identifies a plurality of available adaptors 18 including, for example, SmpAdaptor 25, SonusCdrAdaptor 26 and ViperPCAdaptor 27. The user may thereafter select SonusCdrAdaptor 26 by dragging the block onto the working space 28.

Figure 2B:
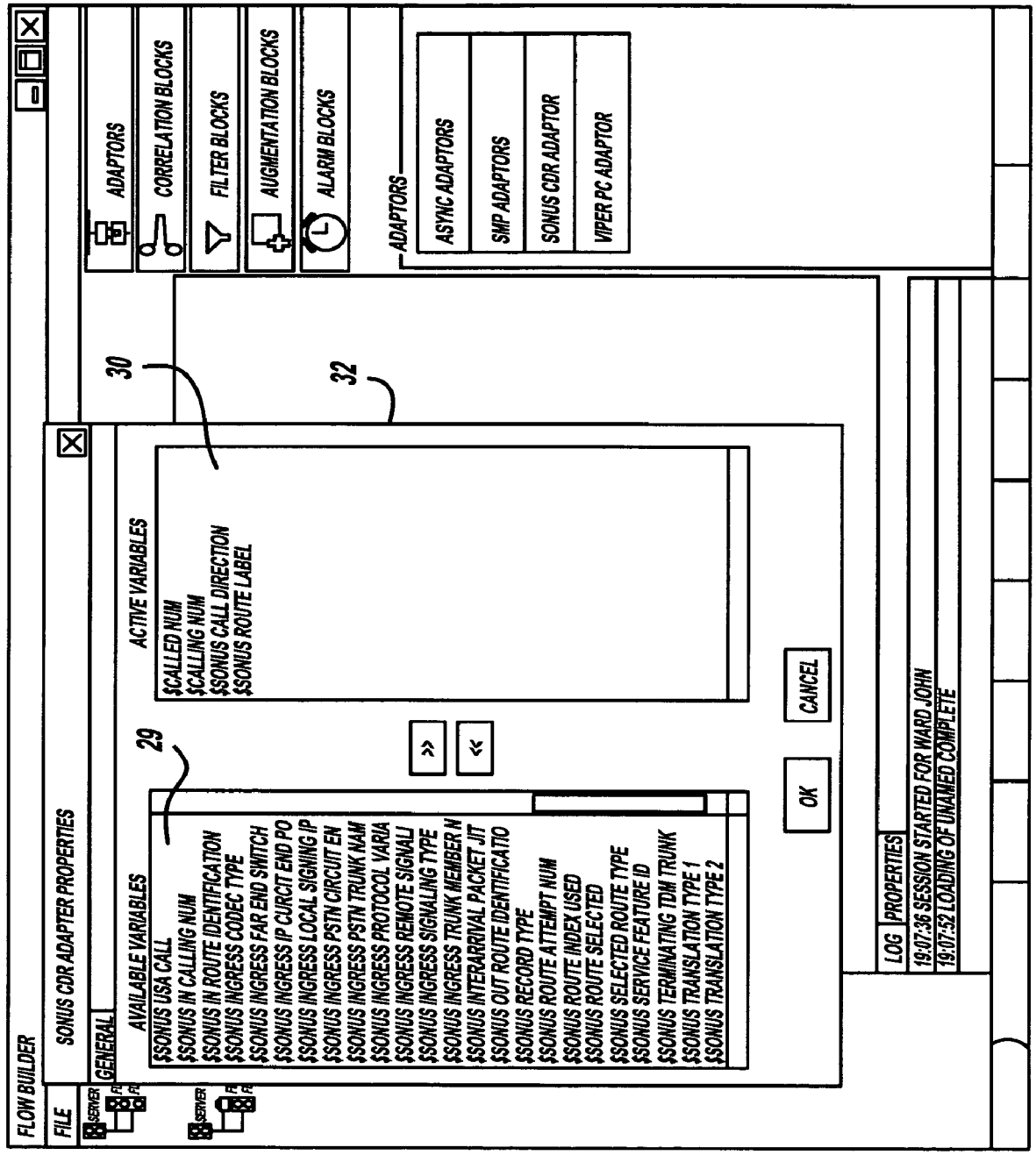
Figure 2C:
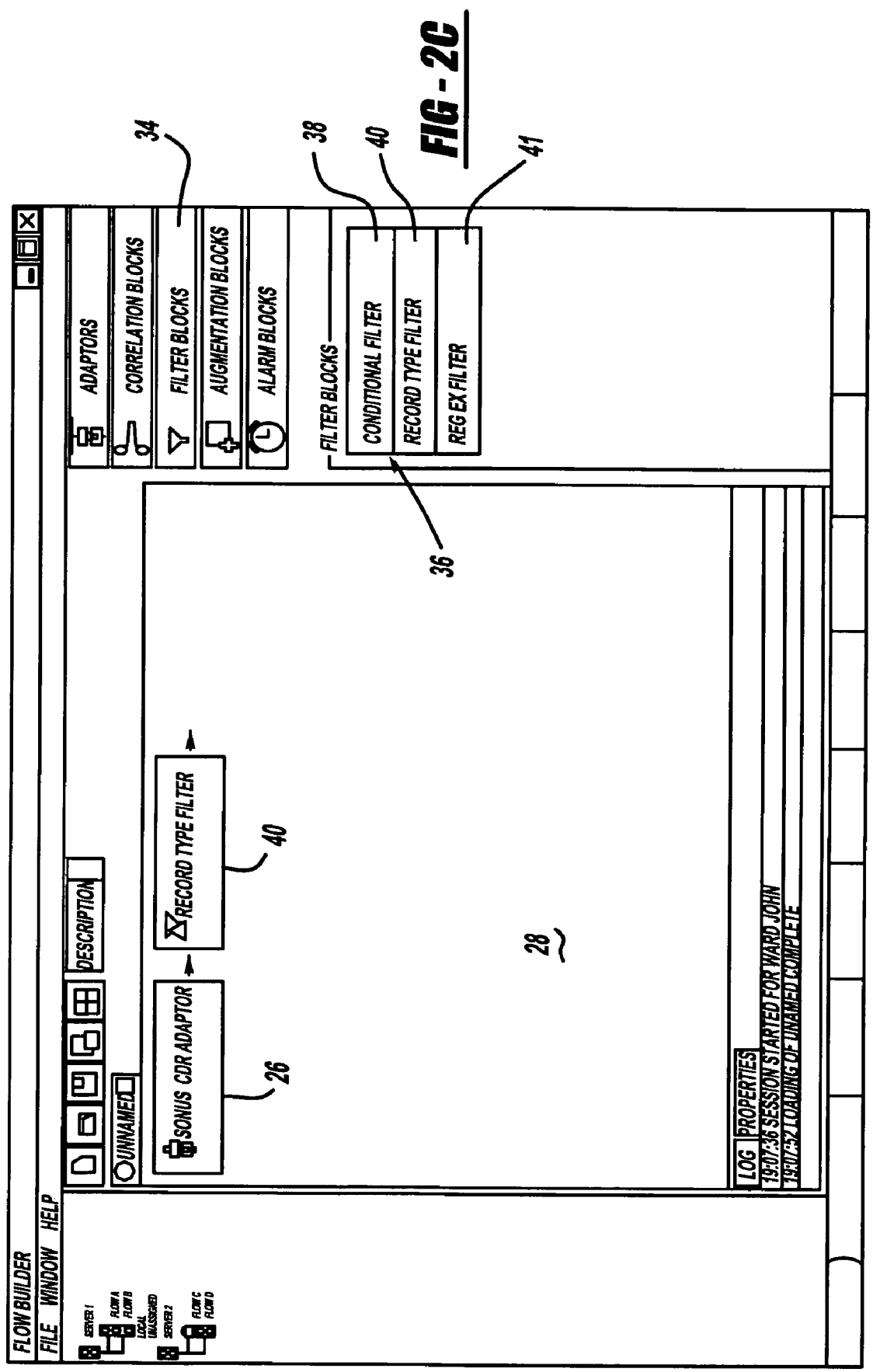
Figure 2D:
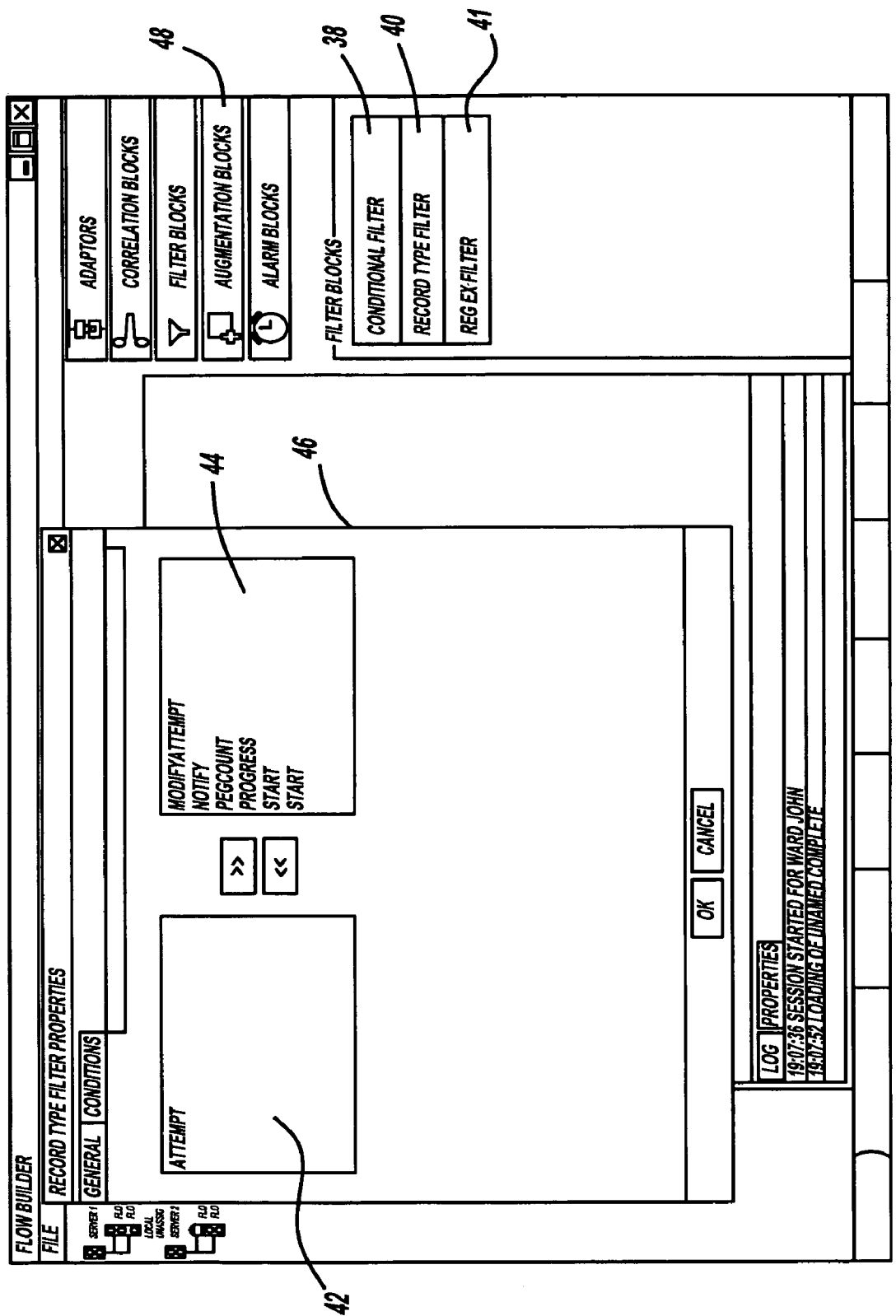

As shown in FIG. 2B, the user may further select the desired metrics (variables) for the selected SonusCdrAdaptor 26 by right clicking a mouse and selecting the Sonus-CdrAdaptor "Properties" in the pop up window 32. The user may thereafter move the listed variables between the "available" and "active" windows 28 and 30 as desired. In the example illustrated, the user selects Called Number, Calling Number, Call Direction and Route Label from the list of all metrics that are available for a CDR. The selected metrics are those that are deemed necessary to detect a route label.

Significantly, the toolbox of the present invention functions to perform error checking during the creation of the analysis and detection flows. Specifically, each processing module being configured by a user knows what variables have already been implemented in upstream modules and are therefore available to it during its own configuration. Using color coding, the toolbox may further inform the user of errors in configuration. For example, in a preferred embodiment, when a processing module is first selected and dragged onto the working space 28, it may be shown in a first color, such as yellow, to indicate that it has not yet been configured. A second color such as, for example, green, may be used to show a module following successful configuration. Finally, a third color, such as red, may be used to show a module that contains configuration errors.

Next, the user filters the data to include records that she is interested in. In the example illustrated in FIG. 2C-2F, the user only wants to analyze calls that didn't set up, i.e. ATTEMPT Records. By clicking on the "Filters" block 34 in the GUI 22, the user is provided with a pull down menu 36 which identifies a plurality of available filters including, for example, ConditionFilter 38, RecordTypeFilter 40, and RegExFilter 41. In the example illustrated, the user selects RecordTypeFilter 40 by dragging the block onto the working space 28. The user may thereafter select the desired variables for the selected RecordTypeFilter 40 by right clicking a mouse (to obtain the RecordTypeFilter "Properties") and moving the listed variables within the "General" file between the "allowed record types" and "blocked record types" windows 42 and 44 of pop up window 46. In the example illustrated, the user has thus selected ATTEMPT as the allowed record types and has blocked all other record types including MODIFY ATTEMPT, NOTIFY, PEGCOUNT, PROGRESS, START, AND STOP.

Figure 2E:
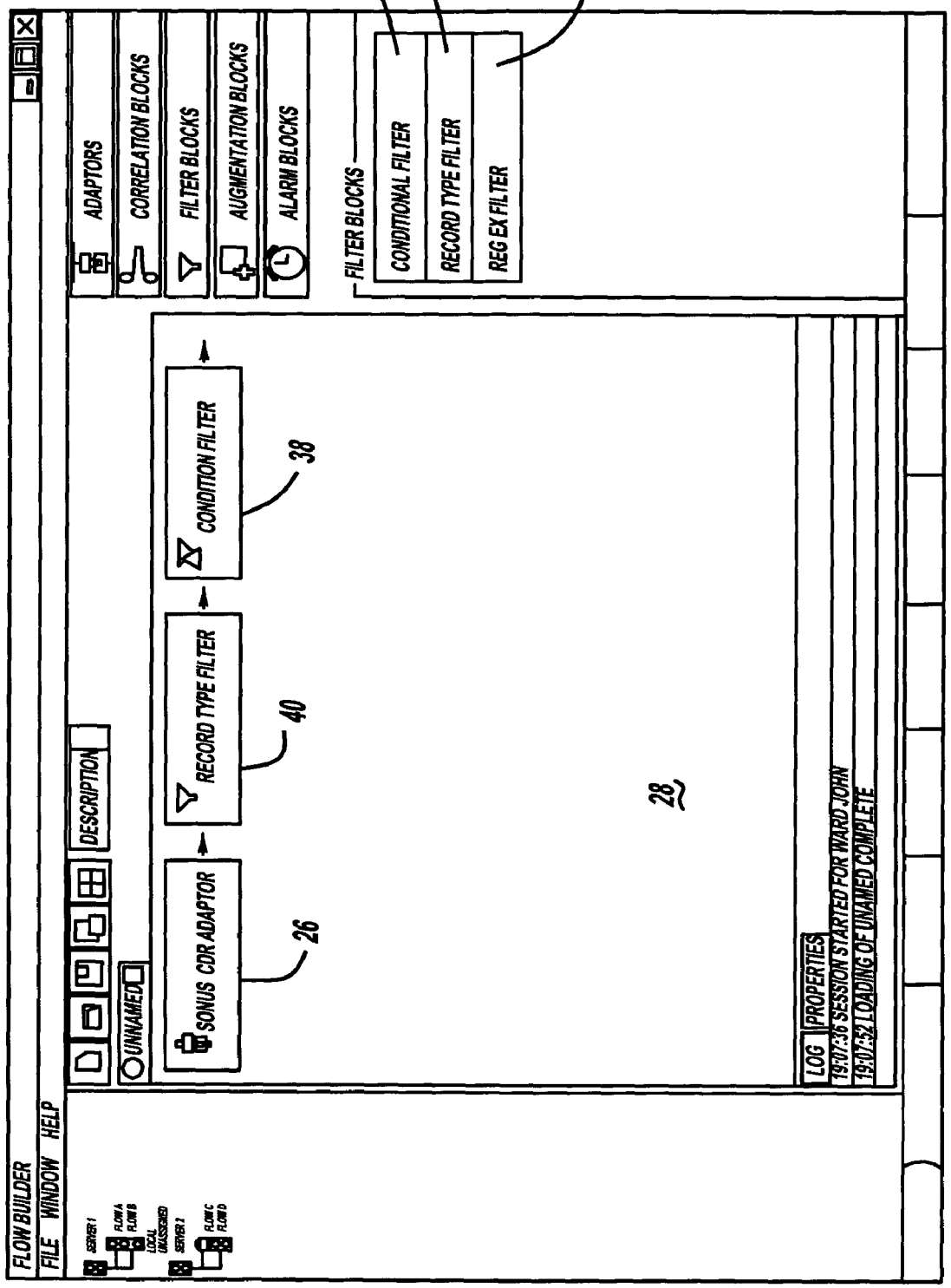
Figure 2F:
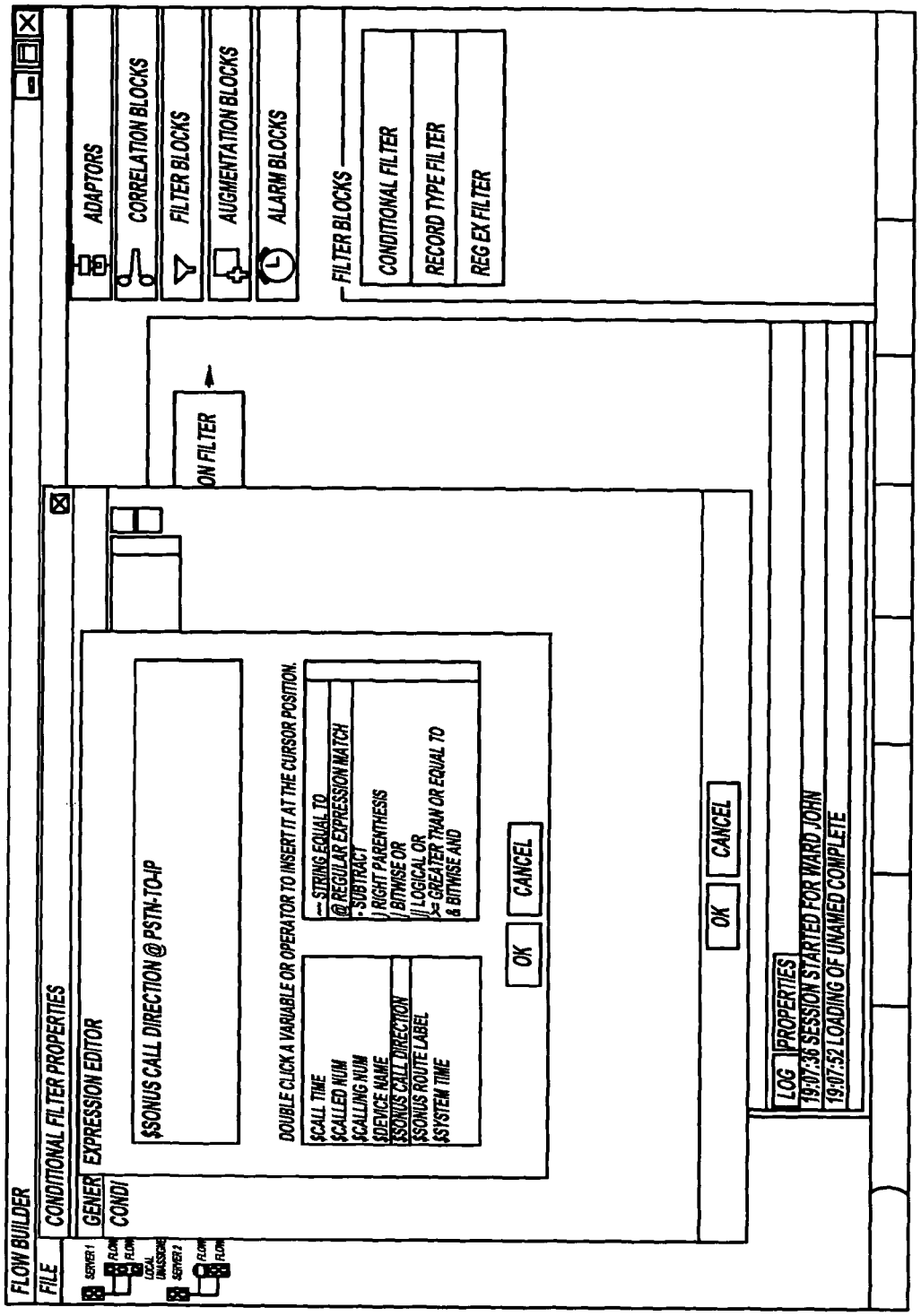
Figure 26:
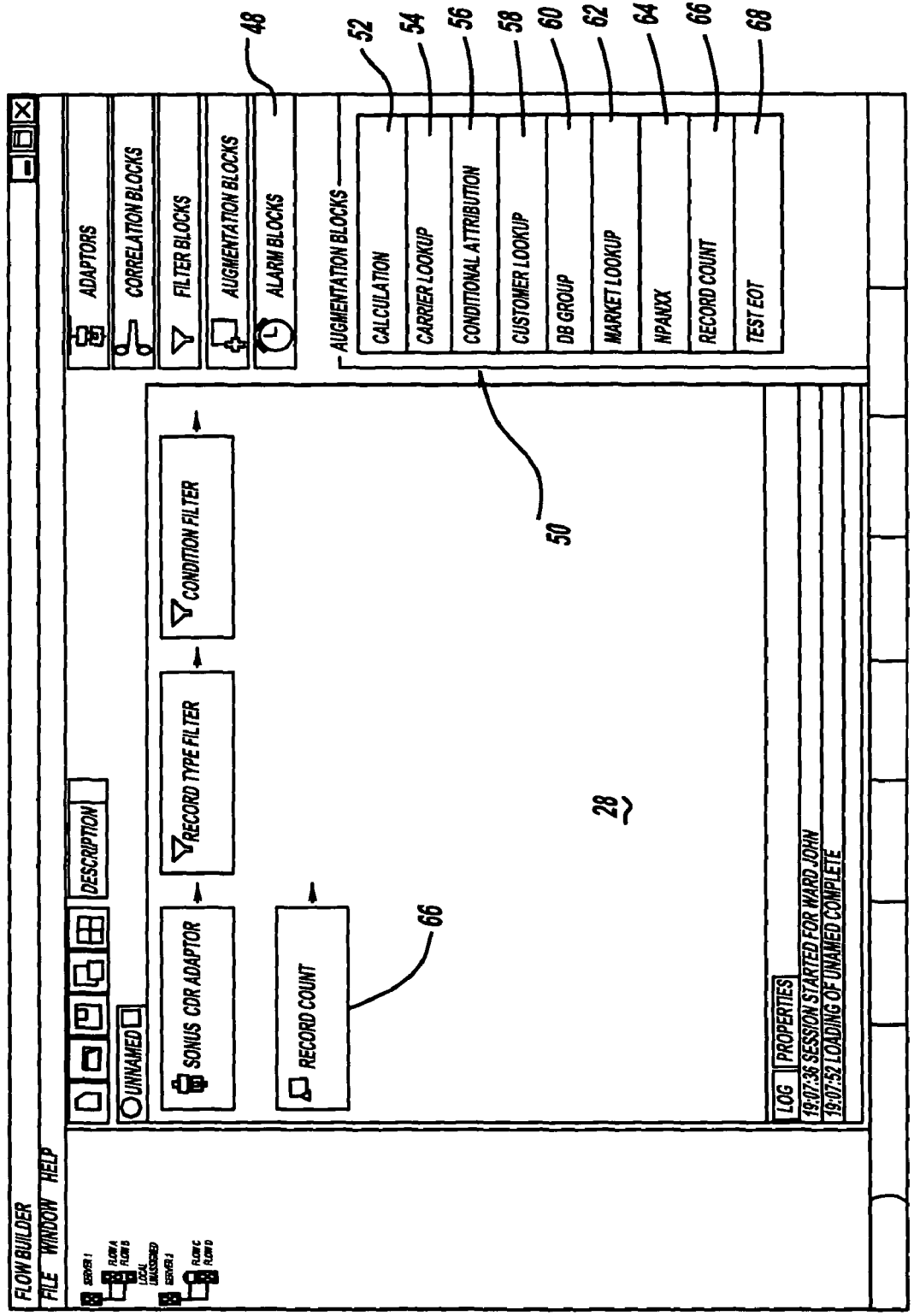

The user further desires to filter the data to exclude calls that have a call direction of IP-TO-PSTN. That is, the user only desires data on PSTN-TO-IP calls. Accordingly, as shown in FIGS. 2E-2F, the user selects and configures ConditionFilter 38 accordingly with the string "$SonusCallDirectio@PSTN-TO-IP".

After selecting and configuring the adaptor and filter modules, 26, 38 and 40, the user may thereafter select and configure appropriate augmentation blocks. Again, the user performs this task by clicking on the corresponding augmentation block 48 in GUI 22 to generate a corresponding pull down menu 50. As shown in FIG. 2G, a variety of augmentation modules are available for selection and configuration, including, Calculation 52, CarrierLookup 54, ConditionalAttribution 56, CustomerLookup 58, DBGroup 60, MarketLookup 62, NpaNxx 64, RecordCount 66, TestEOT 68, etc. Here, the user desires to count the number of attempts (telephone calls) that pass through the flow 16 with the value held in a variable called CallAttempts. More simply, RecordCount is a module that enables the user to assign a name to the fact that a record is passing through the flow 16 which may be thresholded against in downstream modules. The user may select this augmentation module by clicking and dragging RecordCount module 66 onto the working space 28.

Figure 2H:
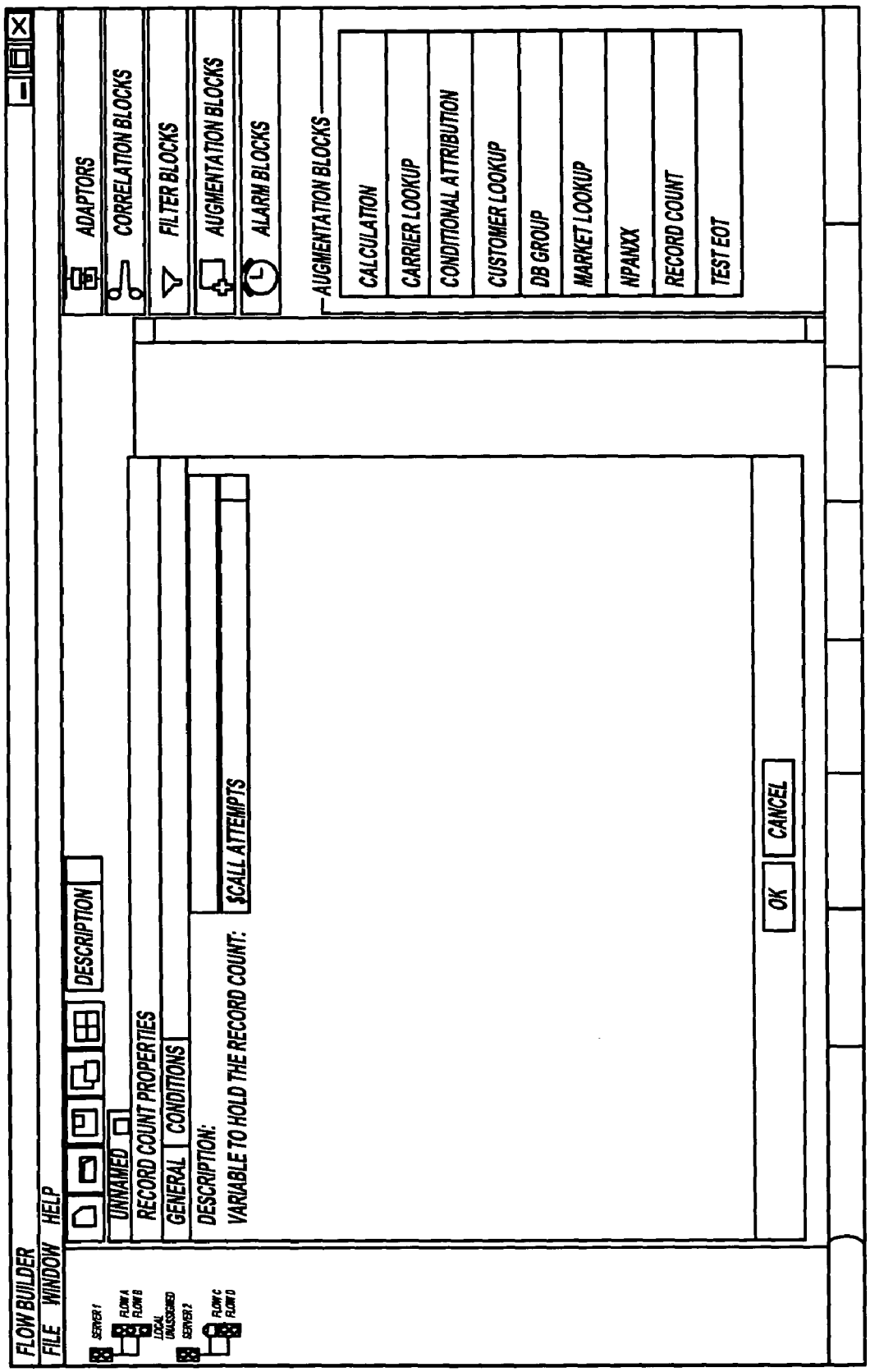
Figure 21:
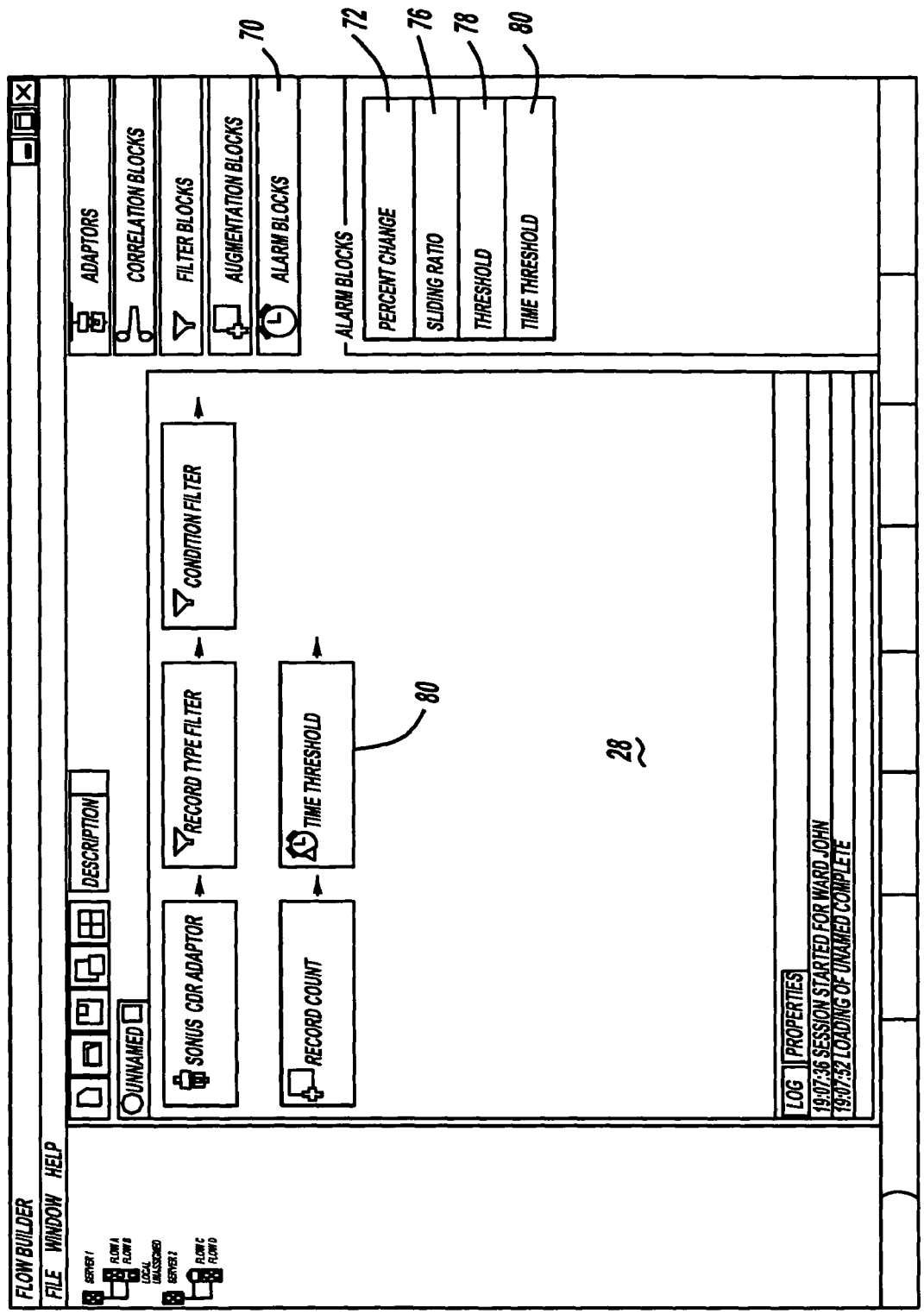
Figure 21:
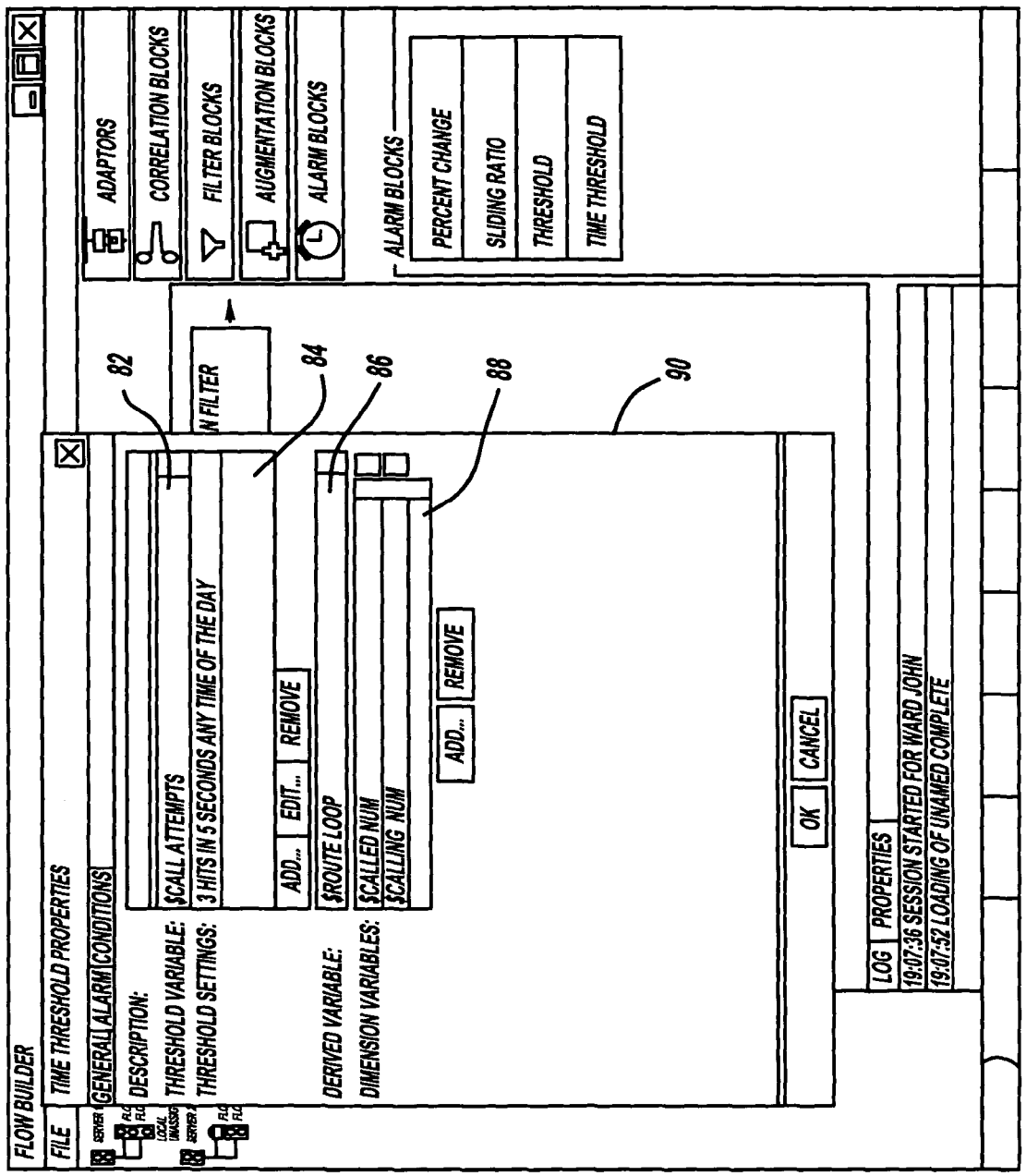
Figure 2K:
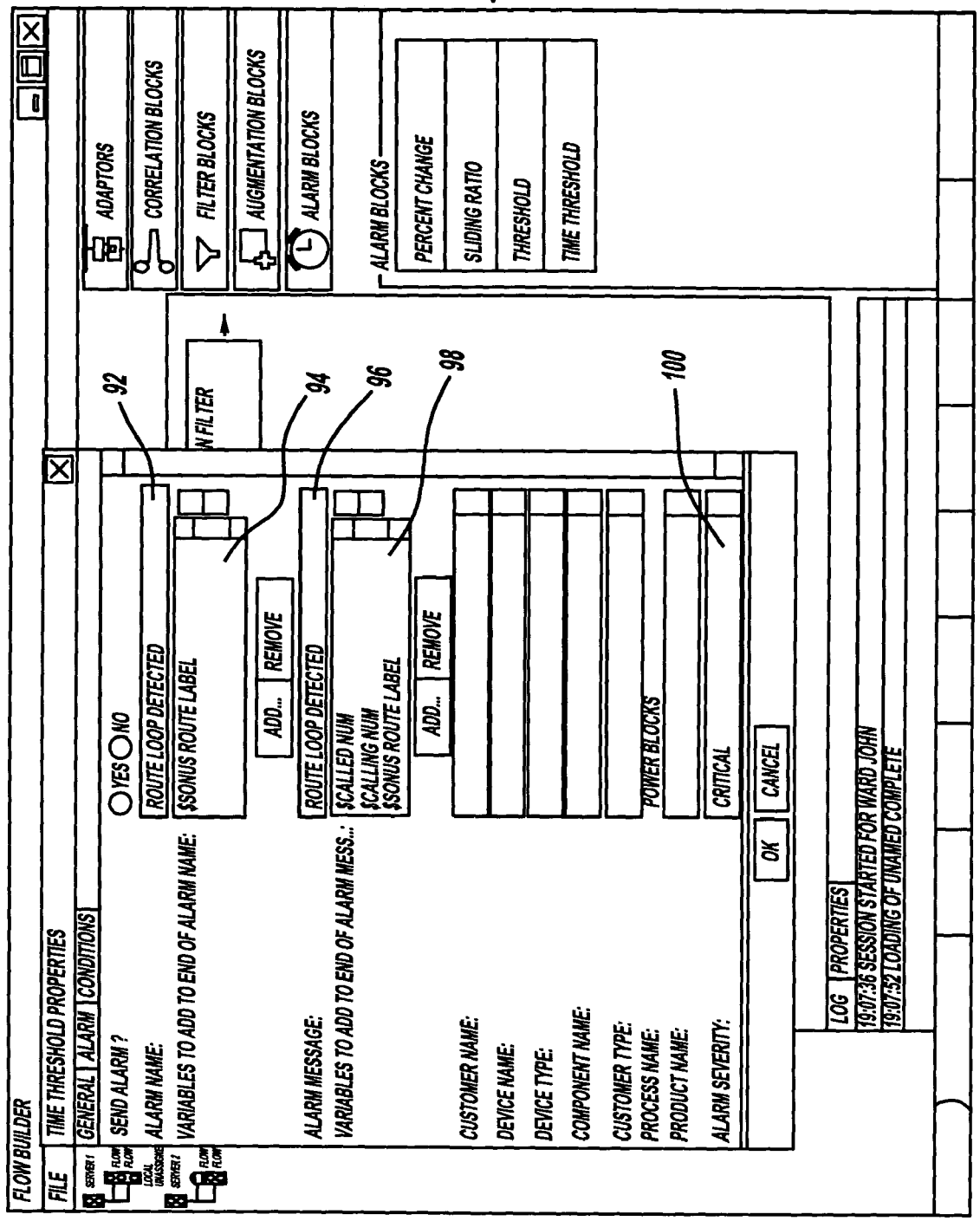

The user may thereafter configure the RecordCount module 66 by right clicking on the module and selecting the corresponding variable in the "General" file of "RecordCount Properties". As shown in FIG. 2H, the user has selected $CallAttempts as the variable to hold the record count.

After selecting and configuring the adaptor, filter and augmentation modules, 26, 38, 40, and 66 the user must thereafter select and configure appropriate alarming modules. As indicated above, and in keeping with the invention, it is the alarming modules which may be specifically configured to operate on subsets of data defined by the user. Accordingly, the user may specify dimensions for which the analysis can be applied. Similar to configuration of the adaptor, filter and augmentation modules, the user initiates configuration by clicking on the corresponding alarming block 70 in GUI 22 to generate a corresponding pull down menu 72. As shown, pull down menu 72 may include a plurality of selections including, for example, PercentChange 74, SlidingRation 76, Threshold 78, and TimeThreshold 80.

In the example illustrated, the flow 16 requires a time threshold. The user thus selects TimeThreshold 80 by clicking and dragging block 80 onto work area 28 as shown in FIG. 2I. Thereafter the user configures module 80 in the same manner discussed above by selecting desired variables in the "General" file, "Alarm" file, etc. as illustrated in FIG. 2J. In the flow being configured, the threshold is on "CallAttempts". The user thus specifies that a "route loop" is defined by 3 call attempts in 5 seconds. The user further dimensions the threshold by specifying that the identified call attempts must belong to unique occurrences of called and calling number pairs (CalledNum and CallingNum). Accordingly, if the same telephone call arrives in the network 3 times in 5 seconds, it will be detected and reported (alarmed on). The user configures the above by selecting and populating the General file with the entries: "$CallAttempts" in the Threshold variable window 82, "3 hits in 5 seconds any time of the day" in the Threshold settings window 84, "$RouteLoop" in the derived variable window 86, and "$CalledNum" and "$CallingNum" in the Dimension variable window 88 of pop up window 90.

The user may similarly configure how the alarm is sent by selecting and populating the Alarm file with the entries: "RouteLoopDetected" in the Alarm name window 92, "$SonusRouteLabel" in the Variables to add to end of alarm name window 94, "Route Loop Detected" in the Alarm message window 96, "$CalledNum" and "$CallingNum" in the Variables to add to end of alarm message window 98, "Critical" in the Alarm severity window 100, etc.

Figure 2L:
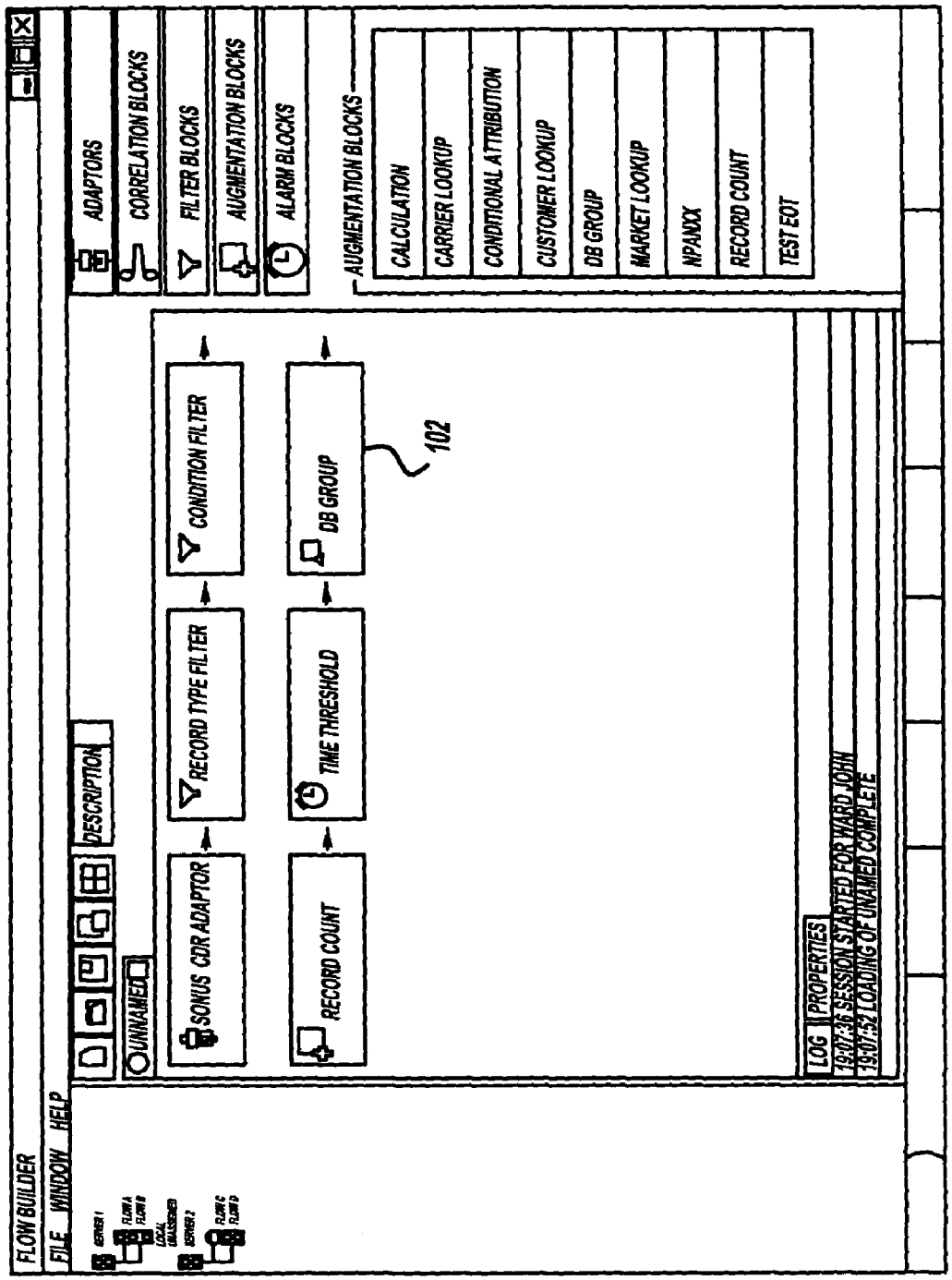
Figure 2M:
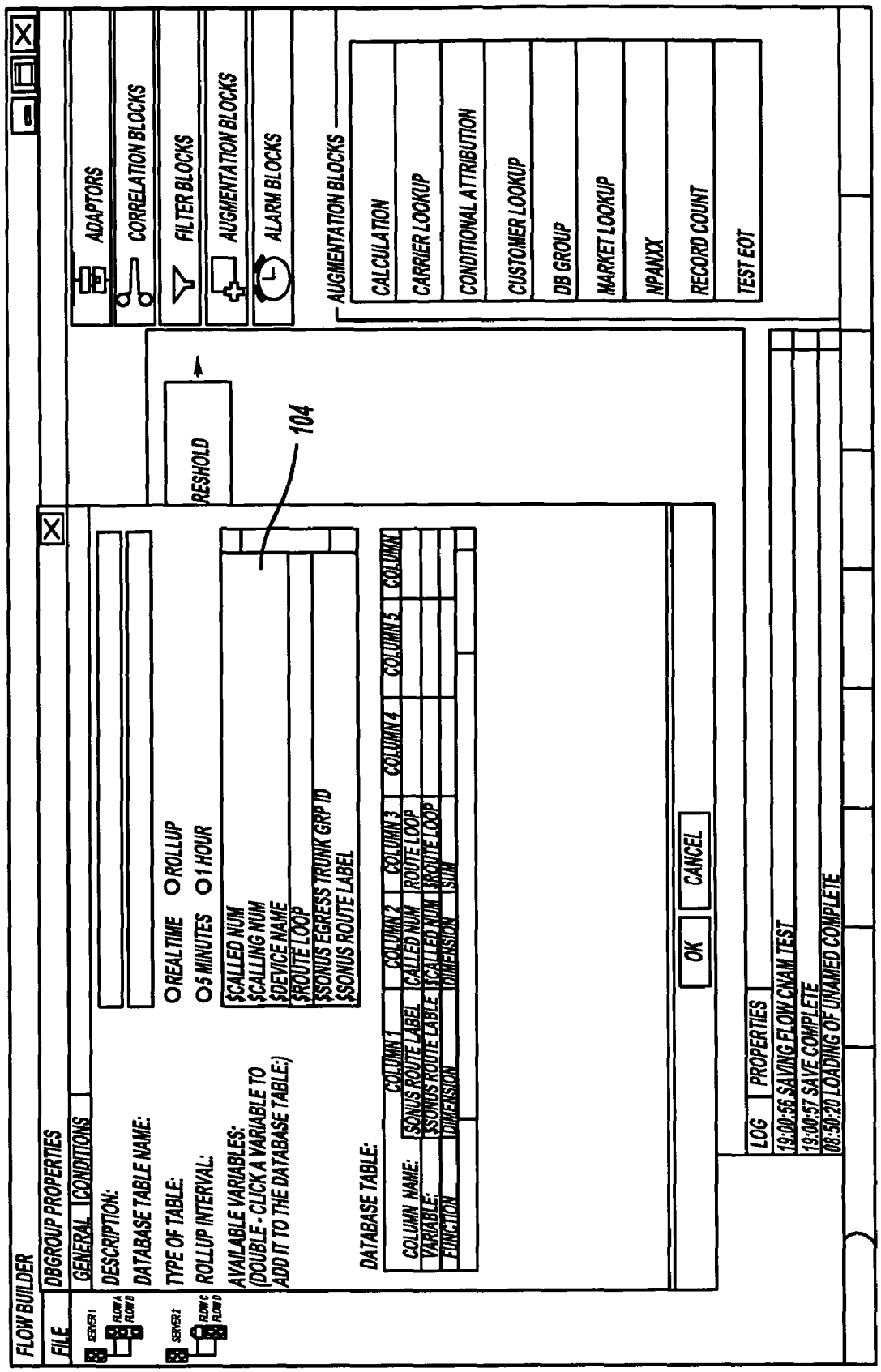

As illustrated in FIGS. 2L-2M, the user may further create a database report of the detected route loops (here DBGroup) 102 by selecting and configuring the appropriate augmentation block in the manner discussed above. Thus, the user may select a table (real time or roll up). If a roll up table is selected as shown, the user may further select the roll up interval, e.g. once an hour. At this point, all of the variables available to the flow 16 based on the upstream configurations are presented in the Available variables window 104. A user may select any of the available variables which will be placed in the database table in columns for which the user will thereafter be prompted to provide names and functions. Significantly, in keeping with the invention, the database table has the same concept of dimensioning provided for the thresholds. However, the dimensioning need not be the same. In the example illustrated, the table has been configured to be dimensioned by route label, called number and route loop. Accordingly, the defined table will count and present the total number of route loops for each unique route label and call number once an hour.

Figure 3:
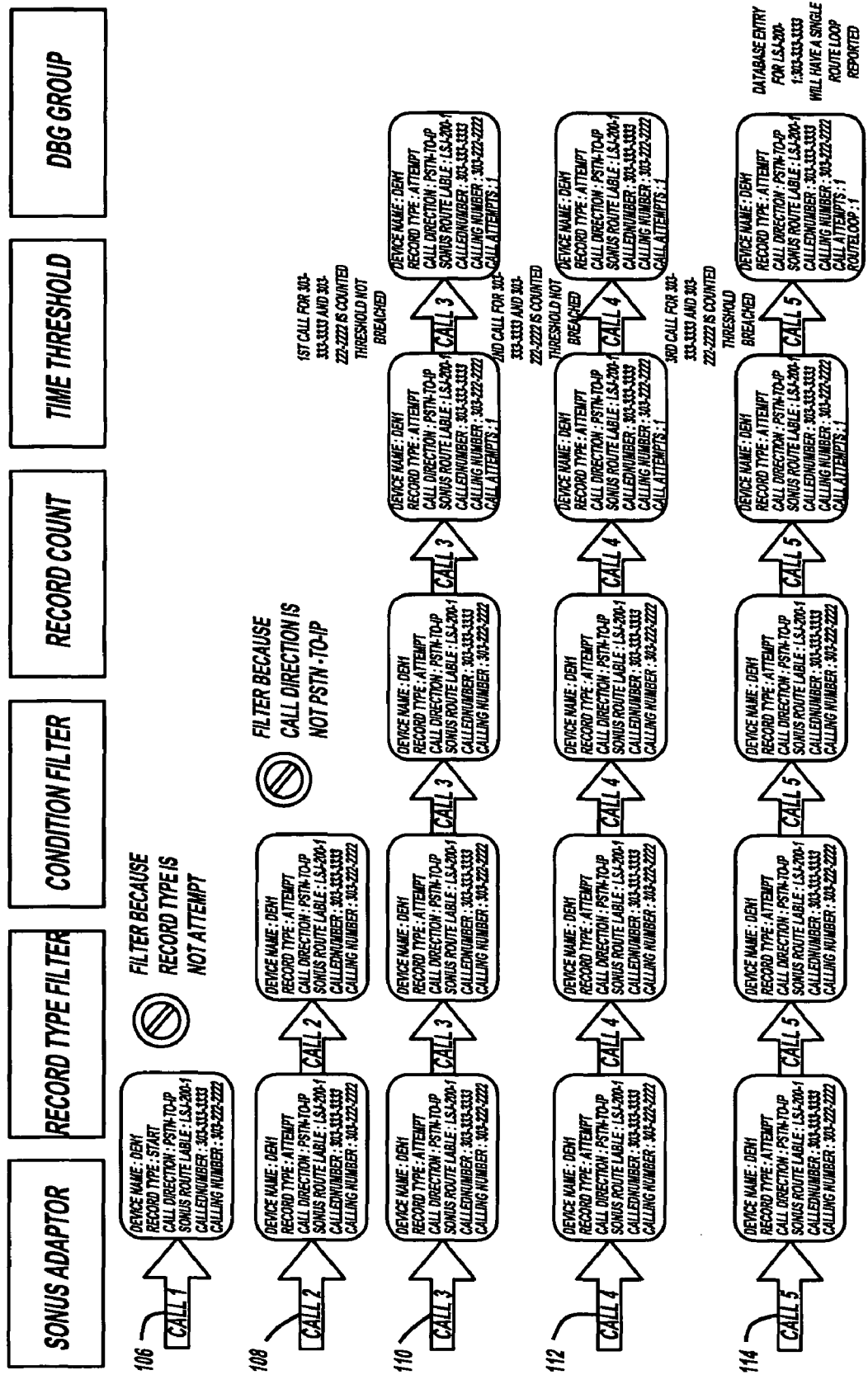
FIG. 3 is a flow diagram of the processing of the flow created and illustrated in FIGS. 2A-2M.

Turning to FIG. 3 of the drawings, there is provided an exemplary data processing flow for the above described flow configuration. The data flow illustrates the processing of multiple calls as they pass through the defined flow 16. For example, "Call 1", designated by reference number 106, comprises a START record type. Accordingly, since the defined flow 16 includes a Record Type Filter 40 which has been configured to pass call attempts only, Call 1, and its corresponding data, are respectively filtered out. "Call 2", designated by reference numeral 108, includes the record type ATTEMPT and is therefore passed through flow 16. However, since the Record Count augmentation module 66 was configured to pass only PSTN-TO-IP calls, this IP-TO-PSTN is filtered out.

Still referring to FIG. 3, "Call 3" is designated by reference number 110. Here, the call includes the proper record type and call direction and is passed through the entire flow 16 and counted. However, since it is the first call detected for the unique calling number/called number pair (303-333-3333/ 303-222-2222) the defined threshold (3 calls in 5 seconds) has not been breached. Accordingly, while the calling number to called number pair is counted, no route loop is detected or reported. The same analysis applies to Call 4 which is designated by reference numeral 112. The calling number to called number pair is counted as the $2^{nd}$ occurrence, but a route loop (as defined in the specific data dimensioning) is not detected or reported. Finally, Call 5, designated by reference numeral 114 passes through flow 16 and breaches the defined threshold. Accordingly, a route loop is detected and written as a corresponding data base entry.

Figure 4:
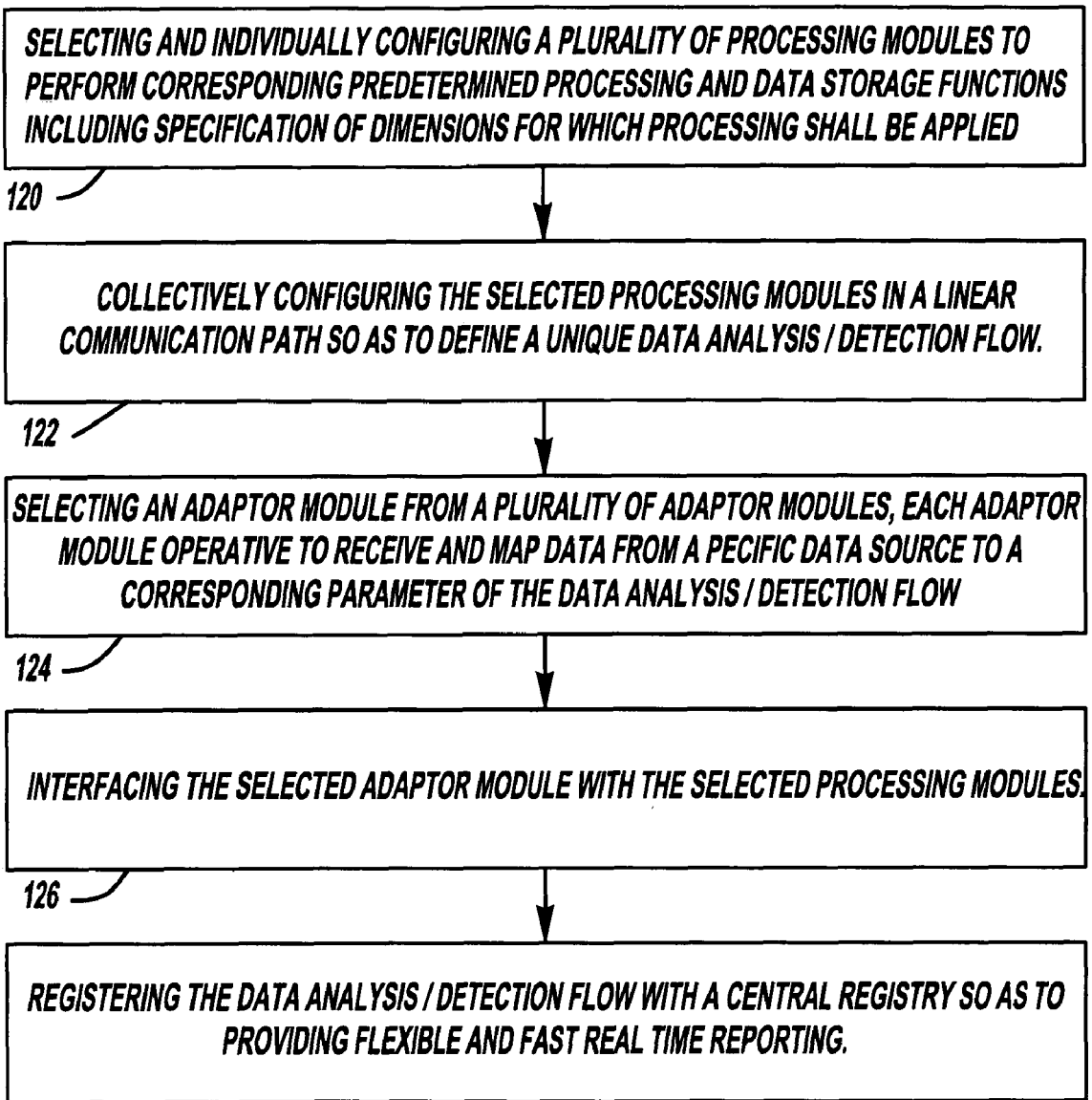
FIG. 4 is a block diagram of the method steps of the present invention for creating an analysis and detection engine for monitoring telecommunications data.

FIG. 4 illustrates the method steps of the present invention for creating an analysis and detection engine. As discussed herein, the method is preferably implemented using 4GL and is specifically implemented to an engine which monitors data in a telecommunication network and provides real time reports. As shown, the method comprises selecting and individually configuring 120 a plurality of processing modules to perform corresponding predetermined processing and data storage functions including specification of dimensions for which processing shall be applied. The method further comprises collectively configuring 122 the selected processing modules in a linear communication path so as to define a unique data analysis/detection flow. Still further, the method comprises selecting 124 an adaptor module from a plurality of adaptor modules, each adaptor module operative to receive and map data from a specific data source to a corresponding parameter of the data analysis/detection flow. Finally, the method comprises interfacing 126 the selected adaptor module with the selected processing modules and registering 128 the data analysis/detection flow with a central registry so as to provide flexible and fast real time data reporting.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A toolbox apparatus for generating an analysis and detection engine operable to monitor and report data in a telecommunications network, comprising:

a processor;

a plurality of user selectable processing modules stored on and executed by the processor, each module individually configurable by a user to perform predetermined processing and data storage functions including specification of dimensions for which processing is applied, and collectively configurable by the user in a linear communication path so as to define a unique data analysis/ detection flow;

a plurality of user selectable adaptor modules, each adaptor module operative to receive and map data from a specific data source of the telecommunications network to a corresponding parameter of the data analysis/detection flow;

wherein each processing module is executed by the processor to perform the predetermined functions and forward data along the linear communication path for further processing by downstream modules of the flow in accordance with individual and collective user configurations so as to provide flexible and fast data reporting in real time; and wherein the plurality of user selectable processing modules comprise a filter module configurable to narrow the data flowing through the flow, an augmentation module configurable to augment the data with additional information, wherein the additional information is used by downstream processing modules, and an alarming module configurable to specify the dimensions for which processing is to be applied.

2. A toolbox apparatus as in claim 1, wherein the plurality of user selectable processing modules are further operative to register to a central registry allowing graphing tools to access the stored data once the flow is created.

3. A toolbox apparatus as in claim 1, wherein the plurality of user selectable processing modules are individually and collectively configurable by a user in 4GL.

4. A toolbox apparatus as in claim 1 further comprising:
an error checking module configured to detect variables in the linear communication path and provide an error notification to the user of potential inconsistencies between the detected variables and the user configurations.

5. A toolbox apparatus for generating an analysis and detection engine operable to monitor and detect call routing anomalies in a telecommunications network, the toolbox apparatus comprising:
a processor;
a plurality of user selectable processing modules stored on and executed by the processor, each module individually configurable by a user in 4GL to perform predetermined processing and data storage functions, including specification of dimensions for which processing is applied, and collectively configurable by the user in a linear communication path so as to define a unique data analysis/detection flow;
a plurality of user selectable adaptor modules, each adaptor module operative to receive and map data from a specific data source of the telecommunications network to a corresponding parameter of the data analysis/detection flow;
a central registry for communicating with and registering each unique data analysis/detection flow;
wherein each processing module is operative to perform the predetermined functions and forward data along the linear communication path for further processing by downstream modules of the flow in accordance with individual and collective user configurations so as to provide flexible and fast data reporting in real time; and
wherein the plurality of processing modules comprise an augmentation module configurable to augment the data with additional information, wherein the additional information is used by downstream processing modules.

6. An analysis and detection engine apparatus operable to monitor and report data in a telecommunications network, comprising:
a processor;
a plurality of processing modules stored on and executed by the processor selected and configured by a user to perform predetermined processing and data storage functions, including specification of dimensions for which processing shall be applied, and collectively configured by a user in a linear communication path so as to define a unique data analysis/detection flow;
an adaptor module operative to receive and map data from a specific data source of the telecommunications network to a corresponding parameter of the data analysis/detection flow;
wherein each processing module is operative to perform its predetermined functions and forward data along the linear communication path for further processing by downstream modules of the flow in accordance with individual and collective user configurations; and
wherein the plurality of processing modules comprise an augmentation module configurable to augment the data with additional information, wherein the additional information is used by downstream processing modules.

7. An analysis and detection engine apparatus operable to monitor and detect call routing anomalies in a telecommunications network, comprising:
a processor;
a plurality of processing modules stored on and executed by the processor, the plurality of processing modules selected and configured by a user in 4GL to perform predetermined processing and data storage functions, including specification of dimensions for which processing shall be applied, and collectively configured by the user in a linear communication path so as to define a unique data analysis/detection flow; and
an adaptor module operative to receive and map data from a specific data source to a corresponding parameter of the data analysis/detection flow;
wherein each processing module is operative to perform the predetermined functions and forward data along the linear communication path for further processing by downstream modules of the flow in accordance with individual and collective user configurations; and
wherein the plurality of processing modules comprise an augmentation module configurable to augment the data with additional information, wherein the additional information is used by downstream processing modules.

8. An analysis and detection engine apparatus as in claim 7, wherein the plurality of processing modules comprise a filter module configurable to narrow the data flowing through the flow.

9. An analysis and detection engine apparatus as in claim 7, wherein the plurality of processing modules comprise an alarming module configurable to specify the dimensions for which processing is to be applied.

10. An analysis and detection engine apparatus as in claim 7 further comprising:
an error checking module configured to detect variables in the linear communication path and provide an error notification to the user of potential inconsistencies between the detected variables and the user configurations.

11. A method for creating an analysis and detection engine in 4GL to monitor and report data in a telecommunications network, comprising:
selecting and individually configuring a plurality of processing modules to perform corresponding predetermined processing and data storage functions using a processor including specification of dimensions for which processing is applied, wherein the processing is applied to each instance of at least one dimension of the specified dimensions;

collectively configuring the selected processing modules in a linear communication path so as to define a unique data analysis/detection flow;

selecting an adaptor module from a plurality of adaptor modules, each adaptor module operative to receive and map data from a specific data source of the telecommunications network to a corresponding parameter of the data analysis/detection flow;

interfacing the selected adaptor module with the selected processing modules;

registering the data analysis/detection flow with a central registry so as to provide flexible and fast real time data reporting; and augmenting the data with additional information, wherein the additional information is used by downstream processing modules.

12. A method as in claim 11, wherein the processing is applied to each unique instance of a plurality of dimensions of the specified dimensions.

13. A method as in claim 11 further comprising performing error checking during the configuration of the analysis/detection flow.

14. A method as in claim 13 wherein the operation of performing error checking comprises comparing variables implemented in the plurality of processing modules.

* * * * *